(12) United States Patent
Basel et al.

(10) Patent No.: US 12,260,202 B2
(45) Date of Patent: Mar. 25, 2025

(54) SYSTEMS AND METHODS FOR SELF-DISCOVERY OF INFORMATION TECHNOLOGY (IT) ENVIRONMENT CHANGES

(71) Applicant: DELL PRODUCTS L.P., Round Rock, TX (US)

(72) Inventors: Tek Prasad Basel, Austin, TX (US); Nikhil Manohar Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 17/853,493

(22) Filed: Jun. 29, 2022

(65) Prior Publication Data

US 2024/0004626 A1 Jan. 4, 2024

(51) Int. Cl.
*G06F 8/61* (2018.01)
*G06F 11/30* (2006.01)
*G06F 11/34* (2006.01)

(52) U.S. Cl.
CPC ............ *G06F 8/61* (2013.01); *G06F 11/3006* (2013.01); *G06F 11/3428* (2013.01); *G06F 11/3452* (2013.01)

(58) Field of Classification Search
None
See application file for complete search history.

(56) References Cited

U.S. PATENT DOCUMENTS

| | | | |
|---|---|---|---|
| 10,496,509 B2 | 12/2019 | Thompson et al. | |
| 10,944,794 B2 | 3/2021 | Dhoble et al. | |
| 11,106,520 B2 | 8/2021 | Abdelhalim et al. | |
| 11,334,410 B1* | 5/2022 | Pearl | G06F 11/0709 |
| 2015/0347214 A1* | 12/2015 | Samuni | G06F 11/0709 |
| | | | 714/37 |
| 2018/0173601 A1* | 6/2018 | Tafas | G06F 1/3203 |
| 2019/0057006 A1* | 2/2019 | Boyapalle | G06F 11/3452 |

(Continued)

OTHER PUBLICATIONS

Dell. "A usage guide to Dell TechDirect", Obtained from Internet May 22, 2022, 4 pgs.

(Continued)

*Primary Examiner* — Lewis A Bullock, Jr.
*Assistant Examiner* — Mark A Gooray
(74) *Attorney, Agent, or Firm* — Egan, Enders & Huston LLP.

(57) ABSTRACT

Systems and methods are provided that may be implemented to automatically discover intended and/or unintended changes as they occur in an IT environment, such as a network that includes multiple endpoint information handling systems. Intended changes may include, but are not limited to, changes in user and device or endpoint system level experience metrics that occur on one or more of the endpoint information handling systems within the IT environment after a planned action occurring in the IT environment. Unintended changes to similar metrics may occur when no activities are planned or initiated for the IT environment. These IT environment changes may be discovered automatically based on individual device level telemetry data and/or fleetwide aggregations derived of benchmarking various telemetry metrics.

23 Claims, 4 Drawing Sheets

(56) References Cited

U.S. PATENT DOCUMENTS

2021/0334111 A1 10/2021 Limonciello et al.

OTHER PUBLICATIONS

Microsoft, "Astra: Custom-Wired DNNs—Microsoft Research", Obtained from Internet May 21, 2022, 1 page.
Microsoft, "Astra: Exploiting Predictability to Optimize Deep Learning—Microsoft Research", Obtained from Internet May 21, 2022, 1 page.
Microsoft, "Telemetry correlation in Application Insights", May 3, 2022, 14 pgs.
Microsoft, "Application Insights telemetry data model", Apr. 20, 2022, 4 pgs.
Microsoft, "Data Lake Analytics", Obtained from Internet May 21, 2022, 11 pgs.
Dell, "Dell SupportAssist (formerly Dell SystemDetect): Overview and Common Questions", Obtained from Internet Apr. 8, 2020, 3 pgs.
1E, "Work from Anywhere—1E", Obtained from Internet May 30, 2022, 4 pgs.
1E, "1E Digital Experience Management Solutions", Obtained from Internet May 30, 2022, 7 pgs.
Nexthink, "Nexthink Proactive IT", Obtained from Internet May 30, 2022, 2 pgs.
Nexthink, "Qualtrics & Nexthink", Obtained from Internet May 30, 2022, 7 pgs.
Nexthink, "Persona Insight", Obtained from Internet May 30, 2022, 1 page.
Nexthink, "Remote Worker Productivity & Employee Experience Management", Obtained from Internet May 30, 2022, 2 pgs.
Microsoft, "Transform your enterprise with Microsoft subscriptions", May 1, 2022, 9 pgs.
Surveymonkey, "How to Create a Pulse Survy & Questions to Ask", Obtained from Internet May 17, 2022, 2 pgs.
Wikipedia, "Net promoter score", Obtained from Internet May 17, 2022, 4 pgs.
1E, "1E Service Desk Automation Software", Obtained from Internet May 30, 2022, 7 pgs.
1E, "1E Unified Endpoint Management Software", Obtained from Internet May 30, 2022, 3 pgs.
Nexthink, "Nexthink ServiceNow ITSM Software Service Management", Obtained from Internet May 30, 2022, 1 pg.
Sentia "Nexthink Empowers you to go beyond", Obtained from Internet May 30, 2022, 7 pgs.
Nexthink, "Nexthink Digital Employee Experience Management Platform", Obtained from Internet May 30, 2022, 4 pgs.
Microsoft, "Overview about power and performance tuning for the Windows Server", Aug. 27, 2021, 11 pgs.
Microsoft, "What is Azure Data Lake Analytics?", Apr. 23, 2021, 4 pgs.
Dell, "Restore your system using Dell SupportAssist OS Recovery", Obtained from Internet Apr. 9, 2020, 9 pgs.
Dell, "TechDirect", 2022, 5 pgs.
Microsoft, "Telemetry channels in Application Insights", Apr. 20, 2022, 10 pgs.
Microsoft, "Windows 10/11 Enterprise E3 in CSP", Apr. 27, 2022, 13 pgs.

* cited by examiner

SYSTEMS AND METHODS FOR SELF-DISCOVERY OF INFORMATION TECHNOLOGY (IT) ENVIRONMENT CHANGES

FIELD OF THE INVENTION

This application relates to information handling systems and, more particularly, to self-discovery of information technology (IT) environment changes for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information technology (IT) stakeholders, (e.g., such as IT administrators, IT planners, IT decision makers, etc.) are often faced with changes that occur in an IT environment. An IT environment may be a corporate or government network that includes multiple endpoint (e.g., client) information handling systems that are administered by an IT administrator across a corporate or government intranet. In such an IT environment, the endpoint information handling systems may be coupled in communication across a corporate or government intranet with one or more internal servers and/or may be coupled in communication across the Internet with one or more external servers.

Types of changes that may occur in an IT environment include intended changes and unintended changes. Intended changes include changes in user and device level experience (e.g., such as health, performance, security, etc.) metrics that occur after a planned software (SW) update or policy change (e.g., such as Microsoft Energy Preference Plan (EPP) change, basic input/output system (BIOS) setting change, etc.) that has been initiated by the IT administrator or the client system user/s. Unintended changes may occur to similar metrics may occur on a single or a group of endpoint information handling systems when no activities are planned or initiated by the IT administrator. Ill effects of both intended and unintended changes result in poor endpoint user experience and lower net promoter scores (NPSs).

Currently, IT stakeholders follow conventional techniques in an attempt to mitigate the risks of intended changes. One conventional technique to address intended changes is to follow a ring-based deployment strategy for deploying policy or software changes, e.g., such as deploying new software or changes to existing software on endpoint systems of an IT environment. Using a ring-based deployment strategy, policy or software changes are initially deployed to only an inner ring (i.e., small subset) of all endpoint information handling systems of a network environment. Intended changes to experience metrics are then measured for the inner ring of information handling systems before making a decision to later deploy the intended change to the remaining endpoint information handling systems of the IT environment. In this conventional technique, conventional user and device level experience metrics are measured and manually correlated by a human user using survey feedback and Pulse survey experience scores (e.g., scored on a scale of one to ten, scored with one to five stars, etc.) from users of the inner ring endpoint systems after the initial deployment of the policy or software changes. If these conventionally measured post-deployment user and device level experience metrics are not acceptable, a decision may be made to postpone, cancel, or change the nature of the policy or software changes before they are deployed to the remaining endpoint information handling systems that are outside the inner ring (i.e., small subset) of the overall IT environment.

Another conventional technique that is currently employed in an attempt to mitigate the risks of intended changes is to deploy policy or software changes in small steps. These small steps include initial steps of user-assisted testing (UAT) of policy or software changes in a laboratory setting followed by pilot user testing and testing by a limited number of users of endpoint client systems on a by-IT environment site basis. During these initial steps, user and device level experience metrics are conventionally measured and manually correlated by a human user before proceeding to the next step of larger scale deployment of policy or software changes to the remaining endpoint systems in the IT environment.

In any case, conventionally measured user and device level experience metrics for measuring intended changes require manual correlation by a human user and are inadequate. For example, BIOS security related update metrics are conventionally measured in terms of percent successful BIOS updates to endpoint systems in an IT environment. However, the same BIOS update may cause other endpoint system adverse effects that are not identified by the conventionally measured metrics, such as increased system boot times, higher system operating temperatures, greater system cooling fan noise, etc.

A performance monitoring system known as Dell® Data Vault (DDV) has been provided on client information handling systems, and collects information on OS updates (update name, publisher, and install date populated by the OS vendor) that is then uploaded to a backend server across the Internet.

SUMMARY OF THE INVENTION

Systems and methods are disclosed herein that may be implemented to automatically self-discover intended and/or unintended changes as they occur in an IT environment, such as a network (e.g., corporate or government intranet) that includes multiple endpoint (e.g., client) information handling systems that are administered by an IT administrator across the network. In this regard, intended changes include, but are not limited to, changes in user and device or endpoint system level experience metrics (e.g., such as health, performance, security, etc.) that occur on one or more of the endpoint information handling systems within the IT environment after occurrence of an event such as a planned software (SW) update or a policy change (e.g., such as Microsoft Energy Preference Plan (EPP) change, basic input/output system (BIOS) setting change, etc.) that has been initiated by the IT administrator or the user/s of the endpoint system/s in the IT environment. Unintended changes to similar metrics may occur on one or more of the endpoint information handling systems within the IT environment when no activities are planned or initiated for the IT environment by the IT administrator. In one embodiment, the disclosed systems and methods may be implemented to self-discover IT environment changes automatically based on individual device (e.g., endpoint system) level telemetry data (e.g., telemetry variables) and/or fleetwide aggregations derived of benchmarking multiple various telemetry metrics.

The disclosed systems and methods may be implemented in one embodiment by an information technology (IT) stakeholder (e.g., such as IT administrator, IT planner, IT decision maker, etc.) to identify ill effects or side effects resulting from intended and unintended IT environment metric changes so that they may be addressed by the IT stakeholder, e.g., in a manner that prevents or reduces poor endpoint system user experience and/or that raises measured IT environment metrics (e.g., such as net promoter scores (NPSs), application performance scores, endpoint system security scores, etc.). Advantageously, the disclosed systems and methods may be implemented in one embodiment to automatically discover unintended changes to metrics occurring on a single endpoint information handling system or a group of endpoint information handling systems in an IT environment, and which are not otherwise discoverable using existing conventional technology. The disclosed systems and methods may also be implemented in one embodiment to provide quantifiable metrics to measure intended IT environment metrics changes resulting from planned policy changes or software updates, e.g., to provide IT stakeholder/s with quantifiable metrics to measure the changes resulting from the planned changes even when there are no ill-effects or side-effects resulting from these planned changes.

In one embodiment, the disclosed systems and methods may be implemented to contextualize self-discovered significant changes in an IT environment by correlating these changes with occurrence of events that are observed in the IT environment across multiple devices (endpoint information handling systems) communicatively coupled together as a fleet of such devices, automatically grouping the devices, and associating the devices with the IT environment change events. In another embodiment, the disclosed systems and methods may be implemented to augment hardware telemetry with process-level telemetry to drive deeper context. In another embodiment, the disclosed systems and methods may be implemented to test for both similarities and differences across devices (endpoint information handling systems) in the fleet before providing self-discovery insights, rather than only looking for differences.

In one respect, disclosed herein is a method, including: determining any change between a current value and a benchmark value of at least one predefined metric for each given one of multiple separate endpoint information handling systems coupled together by a network within an information technology (IT) environment; then associating each determined change between the current value and the benchmark value of the predefined metric for each given one of the multiple separate endpoint information handling systems with at least one common context attribute that is associated with each given one of the multiple separate endpoint information handling systems; then identifying a group of the multiple separate endpoint information handling systems that each has a corresponding determined change between the current value and the benchmark value of the predefined metric that is associated with the at least one common context attribute; and then reporting information regarding the identified group of the multiple separate endpoint information handling systems to a user of a designated information handling system coupled by the network to each of the multiple separate endpoint information handling systems within the IT environment.

In another respect, disclosed herein is a designated information handling system, including a programmable integrated circuit coupled by a network to multiple separate endpoint information handling systems within an information technology (IT) environment, the programmable integrated circuit being programmed to: determine any change between a current value and a benchmark value of at least one predefined metric for each given one of the multiple separate endpoint information handling systems within the IT environment; then associate each determined change between the current value and the benchmark value of the predefined metric for each given one of the multiple separate endpoint information handling systems with at least one common context attribute that is associated with each given one of the multiple separate endpoint information handling systems; then identify a group of the multiple separate endpoint information handling systems that each has a corresponding determined change between the current value and the benchmark value of the predefined metric that is associated with the at least one common context attribute; and then report information regarding the identified group of the multiple separate endpoint information handling systems to a user of the designated information handling system.

DESCRIPTION OF ILLUSTRATIVE EMBODIMENTS

Figure 1:
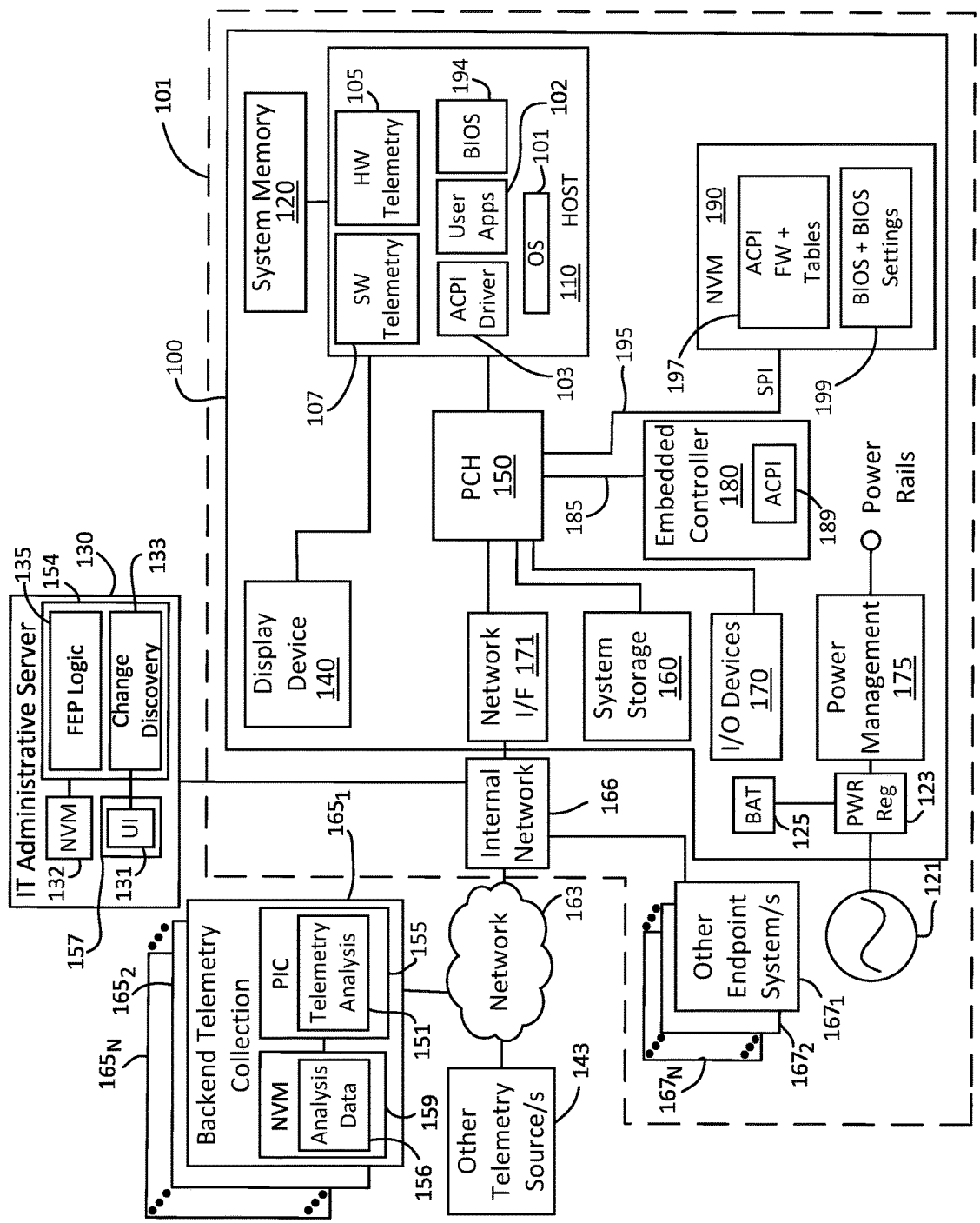
FIG. 1 illustrates a block diagram of an information handling system within an IT environment according to one exemplary embodiment of the disclosed systems and methods.

FIG. 1 is a block diagram of an endpoint information handling system 100 (e.g., a desktop computer, laptop computer, tablet computer, MP3 player, personal data assistant (PDA), cell phone, etc.) as it may be configured and communicatively coupled to other components, including other components of an information technology (IT) environment 101 and other external components, according to one embodiment of the disclosed systems and methods. In this regard, it should be understood that the configuration of FIG. 1 is exemplary only, and that the disclosed methods may be implemented on other types of information handling systems and IT environment configurations. It should be further understood that while certain components of an endpoint information handling system 100 and IT environment are shown in FIG. 1 for illustrating embodiments of the disclosed systems and methods, an information handling system and associated IT environment are not restricted to including only those components shown in FIG. 1 and described below.

As shown in FIG. 1, endpoint information handling system 100 may generally include a host programmable integrated circuit 110 for executing an operating system (OS) 101 (e.g., proprietary OS such as Microsoft Windows 10, open source OS such as Linux OS, etc.) and BIOS 194 for system 100, and other code such as user software applications 102 (e.g., word processing application, Internet browser, computer game, PDF viewer, spreadsheet application, etc.). An Advanced Configuration and Power Interface (ACPI) driver 103 may also be executed on host programmable integrated circuit 110 as shown for discovering, configuring and monitoring performance of hardware components (e.g., CPU 110, system storage 160, power management 175, EC 180, etc.).

In FIG. 1, host programmable integrated circuit 110 may be configured as shown to access non-volatile memory 190 (e.g., serial peripheral interface (SPI) Flash memory) to load and boot part of a system BIOS 194. Other non-volatile memory (NVM) devices may be additionally or alternatively present and accessible by host programmable circuit 110, e.g., system storage 160 including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled as shown to main system memory 120, which may include, for example, random access memory (RAM), dynamic RAM (DRAM), synchronous DRAM (SDRAM).

In the illustrated embodiment, host programmable integrated circuit 110 may be coupled to an external or internal (integrated) display device 140 (e.g., LCD or LED display or other suitable display device) depending on the particular configuration of endpoint information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for endpoint information handling system 100.

In the embodiment of FIG. 1, platform controller hub (PCH) 150 controls certain data paths and manages information flow between components of the information handling system 100. As such, PCH 150 may include one or more integrated controllers or interfaces for controlling the data paths connecting PCH 150 with host programmable integrated circuit 110, system storage 160, input/output (I/O) devices 170 that form at least a part of a user interface for the information handling system, network interface (I/F) device 171, embedded controller (EC) 180 executing ACPI instance 189, and NVM 190 where BIOS firmware image and settings 199 may be stored together with other components including ACPI firmware 197. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

As shown, external and/or internal (integrated) I/O devices 170 (e.g., a keyboard, mouse, touchpad, touchscreen, etc.) may be coupled to PCH 150 of system 100 to enable the endpoint system user to input data and interact with programmable integrated circuits of information handling system 100, and to interact with application programs or other software/firmware executing thereon. The network OF device 171 of endpoint system 100 enables wired and/or wireless communication with other information handling systems 143, $165_1$ to $165_N$, and $167_1$ to $167_N$ of FIG. 1 via an internal network 166 (e.g., corporate or government intranet) and/or an external network 163 (e.g., the Internet). In one embodiment, network OF device 171 may be a network interface controller (NIC) which may communicate with external network 163 across the intervening internal or local area network (LAN) 166, and/or possibly across other networks such as wireless LAN (WLAN), cellular network, etc.

It will be understood that one or more of the other information handling systems of FIG. 1 that are described further herein (e.g., IT administrative server 130, other external telemetry sources (e.g., servers) 143, external back-end telemetry collection servers $165_1$ to $165_N$, and one or more other endpoint systems $167_1$ to $167_N$ of IT environment 101, etc.) may be configured in one embodiment with similar internal hardware and/or software components and similar internal system architecture as described and illustrated herein for endpoint client system 100.

Endpoint system 100 of FIG. 1 also includes local system storage 160 (e.g., one or more media drives, such as hard disk drives, optical drives, NVRAM, Flash memory, solid state drives (SSDs), or any other suitable form of internal or external storage) that is coupled through PCH 150 to provide non-volatile storage for information handling system 100.

A power source for the endpoint information handling system 100 may be provided via an external power source 121 (e.g., mains power) and an internal power supply controller and regulator 123, and/or by an internal power source, such as a battery 125. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

Embedded controller (EC) 180 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

In the embodiment of FIG. 1, endpoint system 100, other endpoint systems $167_1$ to $167_N$, and IT administrative server 130 are coupled together to form IT environment 101 by internal network 166 as shown. Each of the systems and internal network 166 of IT environment 101 are in turn coupled to external network 163 and external systems $165_1$ to $165_N$ by internal network 166 as shown. In the embodiment of FIG. 1, IT administrative server 130 (e.g., operated by a human administrator) monitors and administers each of endpoint systems 100 and 167 across internal network 166. In one embodiment, IT administrator server 130 may be an "on-premise" server operating at the same physical location as each of endpoint client systems 100 and 167, which together form the internal IT environment 101 at this physical location. In one embodiment, external systems 143 and 165 may be remote systems that operate at a different physical (e.g., different geographical location) than each of endpoint client systems 100 and 167, internal network 163, and IT administrative server 130.

In the embodiment of FIG. 1, IT administrative server 130 includes a programmable integrated circuit 154 (e.g., such as a host CPU) coupled to a display device 157 to present a user interface (UI) to a human administrative user of server 130. As further shown in FIG. 1, programmable integrated circuit 154 is programmed to execute change discovery logic 133 to analyze hardware telemetry information (e.g., system-level hardware telemetry, fleet wide aggregated hardware telemetry, etc.) concerning operation of endpoint information handling systems 100 and 167 to automatically self-discover intended and/or unintended changes (e.g., from normal) to user and/or device level experience metrics as they occur on the endpoint information handling systems 100 and 167 within IT environment 101. Change discovery logic 133 may further execute to contextualize these self-discovered changes to user and/or device level experience metrics by analyzing process-level (e.g., software, firmware, etc.) telemetry and correlating these experience metric changes with process-level events observed across one or more of the endpoint information handling systems 100 and 167 in the IT environment 101. Further information on exemplary embodiments of the operation of (and methodology that may be implemented by) change discovery logic 133 is illustrated and described in relation to FIGS. 2A and 2B herein.

In one embodiment, programmable integrated circuit 154 of IT administrative server 130 may also execute a front end platform logic 135 in communication with change discovery logic 133 to provide (or enhance) an IT administrative user-facing UI 131 displayed on display device 157, e.g., for displaying discovered IT environment change results to an IT administrator user, for providing IT administrator management and controls, etc. Examples of front end platform logic 135 include, but are not limited to, Microsoft Azure Application Insights, Tech Direct available from Dell Technologies, Inc. of Round Rock, Texas, Apex powered by Microsoft Astra backend, etc.

Also illustrated in the embodiment of FIG. 1 are one or more backend telemetry collection servers $165_1$ to $165_N$ that may be coupled in communication with IT administrative server 130 and endpoint information handling systems 100 and 167 via external network 163 and internal network 166. As described further herein, each of backend telemetry collection servers $165_1$ to $165_N$ may receive and collect telemetry on hardware and/or software/processes executing on each endpoint information handling system 100 and 167, and store this as analysis data 156 on non-volatile memory (or other non-volatile storage) 159 of the backend telemetry collection server 165 for further analysis by a programmable integrated circuit 155 of the backend telemetry collection server 165. Each backend telemetry collection server 165 may report the collected telemetry analysis data and/or results of analysis on the telemetry analysis to change discovery logic 133 executing on a programmable integrated circuit 154 of IT administrative server 130. In one embodiment, each of backend telemetry collection servers $165_1$ to $165_N$ may be similarly configured to each other with respect to components 155, 156 and 159.

As further shown in FIG. 1, host programmable integrated circuit 110 may execute hardware telemetry collection logic 105 (e.g., such as Dell Telemetry Platform and/or Dell Data Vault available from Dell Technologies, Inc. of Round Rock, Texas) to monitor and capture telemetry information on how various hardware components of endpoint system 100 are used and performing, e.g., by monitoring and recording CPU processing utilization for various user applications 102 and other processes executing on host programmable integrated circuit 110, by monitoring and recording processing utilization of EC 180, by monitoring and recording storage utilization and read/write speeds for system storage 160, by monitoring and recording memory utilization of system memory 120, by monitoring and recording operation of power management system 175 (e.g., including battery runtime and charging intervals, etc.), by monitoring and recording system cooling fan speeds and system operating temperature, etc. Hardware telemetry collection logic 105 may gather this telemetry information on endpoint system 100 from hardware running on host programmable integrated circuit 110, and forward this telemetry information to a backend hardware telemetry collection server $165_1$ where it may be stored (e.g., on non-volatile memory 156 or other non-volatile server system storage) for further analysis by a programmable integrated circuit 155 of server $165_1$. Programmable integrated circuit 155 of server $165_1$ may report the results of this hardware analysis and/or the collected hardware performance and usage telemetry across external network 163 and internal network 166 to change discovery logic 133 executing on a programmable integrated circuit 154 of IT administrative server 130.

Also shown executing on host programmable integrated circuit 110 is software and process utilization level telemetry collection logic 107 (e.g., such as Microsoft Azure Application Insights, etc.) to monitor and capture telemetry information on how various software components (e.g., user applications 102, etc.) are used and are performing on host programmable integrated circuit 110. Software and process telemetry collection logic 107 may gather this telemetry information on endpoint system 100 from software applications and other processes executing on host programmable integrated circuit 110, and forward this information to a backend software/process telemetry collection server 1652 where it may be stored (e.g., on non-volatile memory 156 or other non-volatile server system storage) for further analysis by a programmable integrated circuit 155 of server 1652.

Programmable integrated circuit 155 of this server 165₂ may report the results of this analysis and/or the collected software and process utilization level telemetry across external network 163 and internal network 166 to change discovery logic 133 executing on a programmable integrated circuit 154 of IT administrative server 130.

In one embodiment, programmable integrated circuits 155 of one or more of backend telemetry collection servers 165₁ to 165ₙ of FIG. 1 may execute logic 151 to provide further support for telemetry analytics for backend or cloud software applications, e.g., such as by executing Microsoft Astra/Platinum software for data ingestion, data lake, analytics infrastructure, machine learning workflows, etc.

As further shown in the embodiment of FIG. 1 other telemetry sources 143 may be coupled to provide other telemetry (including metrics) to change discovery logic 133 executing on a programmable integrated circuit 154 of IT administrative server 130 from additional sources, e.g., such as remote server/s executing web services such as Zoom web conference service, Microsoft 365 E3, E5, ET enterprise cloud software service, etc. Examples of such other telemetry include, for example, user experience ratings (e.g., one to ten star user rating obtained during a web conference from users of endpoint system/s 100 and/or 167, one to ten star user rating obtained for enterprise software users of endpoint system/s 100 and/or 167, etc.).

Figure 2A:
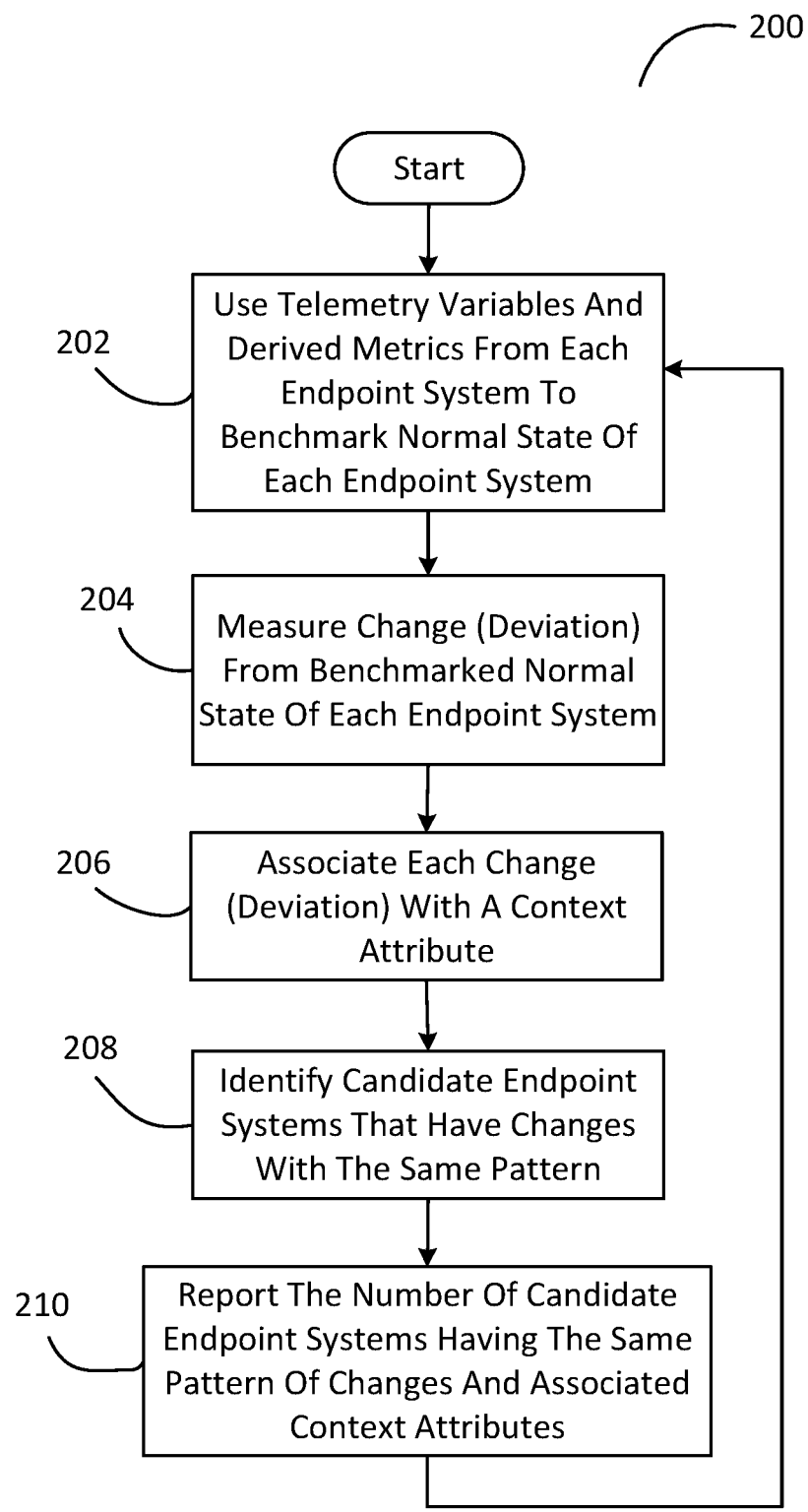
FIG. 2A illustrates methodology according to one exemplary embodiment of the disclosed systems and methods.

FIG. 2A illustrates one exemplary embodiment of an iterative change discovery methodology 200 that may be implemented by change discovery logic 133 executing on programmable integrated circuit 110 of IT administrative server 130 to automatically discover intended and/or unintended changes as they occur, e.g., on endpoint information handling systems 100 and 167 in IT environment 101. In one embodiment of FIG. 2A, methodology 200 may be automatically implemented with no events or time-windows being defined by an IT administrator user of IT administrative server 130. Although described in relation to the exemplary embodiment of FIG. 1, it will be understood that methodology 200 may be implemented in other embodiments using different configurations of internal endpoint information handling systems, IT administrative server/s, internal IT environment, and external components communicatively coupled thereto.

As shown, iterative methodology 200 begins in block 202 where initial telemetry variables and initial derived metrics from each given endpoint information handling system 100 and 167 (i.e., device) are used to benchmark the metrics for the normal (i.e., baseline) state of the given endpoint system.

Next, in block 204, changes (i.e., deviations) from the benchmarked normal (i.e., baseline) state are later measured for each given metric by comparing the initial benchmarked "Before" value of the given metric for each endpoint handling system 100 and 167 to a later-measured "After" value of the given metric for the same endpoint handling system 100 and 167.

Next, in block 206, each measured change is associated with a context attribute (e.g., event) derived from other telemetry variables (e.g., events associated with an intended change such as a particular new software or firmware application installed by an endpoint system user, or events associated with an unintended change such as a particular automatic software or firmware update or plug-in that is added by a self-updating software or firmware application).

Next, in block 208, one or more groups of particular candidate endpoint information handling systems 100 and/or 167 are identified that have corresponding particular measured changes and associated (or correlated) context attributes with the same pattern. The number of identified candidate endpoint systems in the group that have the same pattern of changes and associated context attributes is also determined. There may be more than one such group of such identified candidate endpoint systems having the same pattern of changes and associated context attribute/s, with each group corresponding to a different measured change.

Next, in block 210, the number of particular candidate endpoint information handling systems 100 and/or 167 in each group of endpoint systems having the same pattern of changes and associated context attributes is reported, e.g., via UI 131 to an IT administrator user of IT administrative server 130. An example of such a report is "We discovered 250 systems with three times (3×) higher network drops associated with roll-out of endpoint configuration management software or process version 'B'" (i.e., in the case where the reported associated context attribute is the replacement of endpoint configuration management software or process version "A" with endpoint configuration management software or process version "B", and where the reported pattern of change is "three times (3×) higher network drops"). Then, block 210 returns to block 202 and methodology 200 iteratively repeats on a periodic basis, e.g., on a daily basis, on a weekly basis, every two weeks, etc.

Figure 2B:
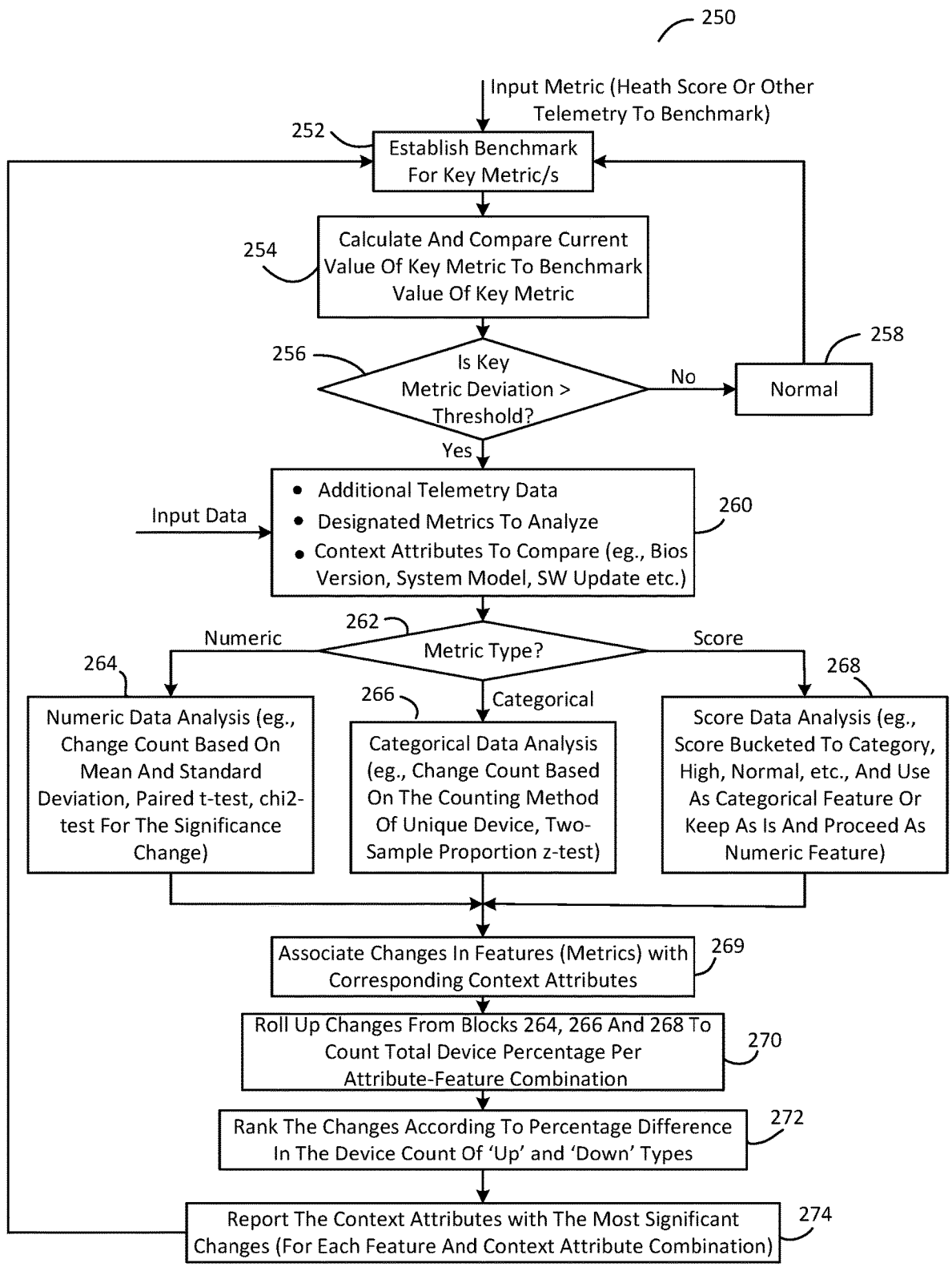
FIG. 2B illustrates methodology according to one exemplary embodiment of the disclosed systems and methods.

FIG. 2B illustrates another exemplary embodiment of an iterative change discovery methodology 250 that may be implemented by change discovery logic 133 executing on programmable integrated circuit 110 of IT administrative server 130 to automatically discover intended and/or unintended changes as they occur, e.g., on endpoint information handling systems 100 and 167 in IT environment 101. In one embodiment of FIG. 2B, methodology 250 may be automatically implemented with no events or time-windows being defined by an IT administrator user of IT administrative server 130. Although described in relation to the exemplary embodiment of FIG. 1, it will be understood that methodology 250 may be implemented in other embodiments using different configurations of internal endpoint information handling systems, IT administrative server/s, internal IT environment, and external components communicatively coupled thereto.

As previously described, intended changes include, but are not limited to, changes in user and system or device or endpoint system level experience metrics (e.g., such as health, performance, security, etc.) that occur after a planned software (SW) update or a policy change (e.g., such as Microsoft Energy Preference Plan (EPP) change, basic input/output system (BIOS) setting change, etc.) that has been initiated by the IT administrator that is operating IT administrative server 130 or the user/s of one or more of endpoint systems 100 and/or 167. Unintended changes to similar metrics may occur on information handling systems 100 and/or 167 when no activities are planned or initiated for the IT environment 101 by the IT administrator that is operating IT administrative server 130. As such, the embodiment of FIG. 2B may be implemented to discover IT environment changes automatically based on individual endpoint system level telemetry data and/or fleetwide aggregations of multiple systems 100 and 167 within IT environment 101. When grouped together, the multiple endpoint information handling systems 100 and 167 within IT environment 101 managed by a common IT administrator (e.g., operating IT administrative server 130) may be referred to as a "fleet" of endpoint information handling systems.

As shown in FIG. 2B, each iteration of methodology 250 starts in block 252 where telemetry variables and derived metrics from each endpoint information handling system 100 and 167 of IT environment are received and used to benchmark user and device level experience metric values that represent the normal (i.e., baseline) state of the system for a current iteration of methodology 250. In one embodiment, block 252 and succeeding blocks 254 and 256 may be performed to automatically detect significant changes to at least one pre-defined key hardware, software and/or process metric that is measured or otherwise derived from telemetry received by change discovery logic 133 (e.g., from the various telemetry sources described in relation to FIG. 1). Such a pre-defined key metric may be related to operation of each endpoint information handling system 100 and 167 of IT environment 101 (e.g., system health score, CPU performance metric, device experience score, application experience score, battery experience score, etc.), and may in one embodiment be initially selected by an IT administrator that is operating IT administrator server 130 to manage IT environment 101. In other embodiments, a default pre-defined key metric may be previously assigned (e.g., by system hardware or software supplier or manufacturer) for change discovery logic 133 without any input from the IT administrator. For monitoring purposes, a single key metric or a relatively small number (e.g., two or three) of key metrics may be chosen in on embodiment as metric/s which directly impact system user experience (e.g., such as system health score and/or experience score).

In block 252, the predefined key metric may be benchmarked, for example, using a monitored value of the pre-defined key metric for each of the endpoint information handling systems 100 and 167 of the IT environment 101 as it was measured during a previous time period that is now assigned to be a benchmark time period ($T_B$), e.g., having a time period length (L) of one day, one week, two weeks, or any other selected shorter or longer time period. The value of the predefined key metric previously measured during this benchmark time period $T_B$ for each given one of systems 100 and 167 of IT environment 101 may be now used as a benchmark or normal (i.e., baseline) operating condition key metric value ($V_B$) for the given system 100 and 167. In one embodiment, the benchmark time period $T_B$ of block 252 may be selected on a rolling basis to be the most recent previous time period for which one or more pre-defined key hardware, software and/or process metrics have been previously measured or otherwise derived from telemetry received by change discovery logic 133 (e.g., benchmarking time period $T_B$ may be a sliding window time period of length L). In block 252, the calculated benchmarked or normal value $V_B$ for the pre-defined key metric may then be stored in non-volatile memory 132 or other non-volatile storage of IT administrative server 130 for use in the following blocks of iterative methodology 250.

As described below, blocks 252 to 256 of each iteration of methodology 250 may be performed on a periodic basis for each new current time period ($T_C$) that immediately follows a most recent previous time period of the preceding iteration that is now assigned to be a benchmarking time period $T_B$ for block 252 of the current iteration. In this regard, the most recent previous time period that was considered to be $T_C$ in the most recent previous iteration is now considered to be the benchmarking time period $T_B$ for the current iteration. Further, the previous value of the predefined key metric measured in the most recent previous current time period (now considered to be $T_B$) for each given endpoint information handling system 100 and 167 is used as a benchmark value for comparison in block 254 to the current value of the predefined key metric that is measured in the current time period $T_C$ for the same given endpoint information handling system 100 and 167. In one embodiment, this key metric value comparison may be executed in a specific time window (e.g., such as a daily or weekly data comparison), and the comparison may run daily or weekly on a sliding window basis.

In block 254, monitored values of the pre-defined key metric during the current time period $T_C$ (e.g., which also may have a time period of length L corresponding to the current $T_B$) are used to calculate a current value ($V_C$) for the pre-defined key metric of each system 100 and 167 of IT environment 101 that occurs during the duration of the current time period $T_C$. This calculated value $V_C$ of the key metric for each endpoint system 100 and 167 is then compared to the respective benchmark value $V_B$ of the key metric for the same endpoint system from block 252 to determine if any deviation or difference in value exists between $V_C$ and $V_B$ for each endpoint system 100 and 167 of IT environment 101. The total number (or fraction or percentage of endpoint information handling systems 100 and 167) in IT environment 101 that exhibit a calculated deviation or difference in value between $V_C$ and $V_B$ is also calculated in block 254.

Next, in block 256, the calculated total number or fraction (or percentage) of endpoint systems having a calculated deviation or difference in value between $V_C$ and $V_B$ is compared to a pre-defined threshold (TH), e.g., such as a predefined threshold number of endpoint systems or a pre-defined fraction (or percentage) of endpoint systems as the case may be. It will be understood that a pre-defined threshold TH of block 256 may be selected as desired or needed to fit the characteristics of a given IT environment 101. For example, threshold TH may be any selected threshold number (e.g., such as 50, 100, 150, etc.) of endpoint information handling systems 100 and 167 within a given IT environment 101, or may be any selected threshold percentage (e.g., such as 40%, 50%, 60%, etc.) of endpoint information handling systems 100 and 167 within a given IT environment.

The following is an example of methodology 250 as it may be performed in one embodiment for an exemplary key metric that is numeric, and using a comparison methodology for block 254 that is calculated dynamically for each of the multiple different endpoint information handling systems 100 and 167 in a given fleet of endpoint information handling systems of an IT environment 101. In this example, assume the key metric for blocks 252 to 256 is CPU usage percent, and that the benchmark value ($V_B$) of block 252 is 15% CPU usage percent for a given endpoint information handling system 100 or 167 (e.g., optionally with a fluctuation of 2% CPU usage percent). Next, assume the calculated current value ($V_C$) for the key metric of block 254 is 25% CPU usage percent for the same given endpoint information handling system (e.g., optionally with a fluctuation of 3% CPU usage percent). Since in block 254 the current key metric value ($V_C$) of 25% CPU usage percent is found to be greater than the benchmark key metric value ($V_B$) of 15% CPU usage percent for the same given endpoint information handling system, this same given endpoint information handling system is counted in this example as having a "higher CPU usage" in the comparison methodology of block 254.

In the above example for an exemplary key metric that is numeric, the comparison methodology of block 254 may be dynamically calculated in the same way for each of the other different endpoint information handling systems 100 and 167 within the fleet of IT environment 101, with it being understood that the current value ($V_C$) and benchmark value ($V_B$) of CPU usage percent for each endpoint information handling system 100 and 167 may be different from the $V_C$ value and $V_B$ value determined for each of the other endpoint information handling systems 100 and 167 based on their respective CPU usage patterns. In this example, after the comparison methodology of block 254 has been performed for each of the endpoint information handling systems 100 and 167 of IT environment 101, methodology 200 moves to block 256, where the total number of endpoint information handling systems 100 and 167 within IT environment 101 that are found to have a higher CPU usage percent in block 254 is calculated. This total number of endpoint information handling systems 100 and 167 having a higher CPU usage percent may then be compared to the total of all endpoint information handling systems 100 and 167 within IT environment 101 to determine the deviation percentage of endpoint information handling systems 100 and 167 within IT environment 101 that have a higher usage percent. This determined deviation percentage of endpoint information handling systems 100 and 167 may then be compared to the pre-defined threshold (TH) in block 256. For example, given a pre-defined threshold (TH) of 50%, a more detailed analysis of blocks 260 to 274 is triggered if the determined deviation percentage is greater than 50%. It will be understood that 50% is just an exemplary TH value for purposes of illustration, and that a TH value may be selected to be any greater or lesser value as appropriate or otherwise needed or desired to fit the type of key metric being analyzed and/or the characteristics of the endpoint information handling systems and IT environment 101 being analyzed.

The following is an example of methodology 250 as it may be performed in one embodiment for an exemplary key metric that is categorical (i.e., a key metric that has categorical value), and using a comparison methodology for block 254 that is calculated dynamically for the multiple different endpoint information handling systems 100 and 167 in a given fleet of endpoint information handling systems of an IT environment 101. In this example, assume that the categorical key metric is health score, and that at a first time of block 252 each of the endpoint information handling systems 100 and 167 within IT environment 101 is classified as either having a "high" severity key metric value or a "normal" severity key metric value. In block 252 of this example, the benchmark value ($V_B$) of block 252 is then determined to be equal to the percentage of all endpoint information handling systems 100 and 167 within IT environment 101 that are determined to have a high severity state at the first time of block 252. Next, in block 254, the total number of endpoint information handling systems of IT environment 101 that have a "high" severity key metric value at a second time (that is later than the first time) is determined, and then the current value ($V_C$) of block 254 is then determined to be equal to the percentage of endpoint information handling systems 100 and 167 within IT environment 101 that are determined to have a high severity state at the later second time of block 254. In block 254, this current value ($V_C$) of block 254 may then be compared to the benchmark value ($V_B$) of block 252 to determine a deviation (difference) between $V_C$ and $V_B$, and this deviation then compared to a pre-defined threshold (TH) in block 256. For example, given a pre-defined threshold (TH) of +3%, a more detailed analysis of blocks 260 to 274 is triggered if the determined deviation percentage of block 254 is greater than +3%, e.g., if $V_B$ is 1% and $V_C$ is 5%, then this deviation would trigger the methodology in blocks 260 to 274. Once again, it will be understood that +3% is just an exemplary TH value for purposes of illustration, and that a TH value may be selected to be any greater or lesser value as appropriate or otherwise needed or desired to fit the type of key metric being analyzed and/or the characteristics of the endpoint information handling systems and IT environment 101 being analyzed.

Still referring to block 256, if the total number or fraction (or percentage) of endpoint systems having a calculated deviation or difference in value between $V_C$ and $V_B$ (from block 254) is found not greater than the predefined threshold TH, then methodology 250 proceeds to block 258 where operation of the IT environment is considered normal and methodology 250 returns to block 252 and repeats as shown. However, if in block 256 the total number or fraction (or percentage) of endpoint systems having a calculated deviation or difference in value between $V_C$ and $V_B$ (from block 254) is found greater than the predefined threshold TH, then methodology 250 proceeds to blocks 260 to 274 where a before/after comparison is made for one or more additional user and/or endpoint system level experience metrics at the individual level of each endpoint information handling system 100 and 167, and the results of this comparison are summarized and reported.

In block 260, additional input data measured for each endpoint information handling system 100 and 167 is made available to use for analysis and comparison as shown. This additional input data may include additional input telemetry (e.g., process-level telemetry) data containing additional user and/or endpoint system level experience metrics (e.g., retrieved from non-volatile memory 132 or other memory of IT administrative server 130 and/or directly from the source/s of this additional input telemetry data), and a list of designated metrics (i.e., features) to analyze (e.g., retrieved from non-volatile memory 132 or other memory of IT administrative server 130). Examples of types of such designated metrics include, but are not limited to, CPU workload, system memory workload, endpoint system alerts (e.g., high system temperature alerts), endpoint system scores (e.g., NPSs, application performance scores, endpoint system security scores, etc.), etc. Other additional input data of block 260 may include a list of designated context attributes (e.g., BIOS version, information handling system model, software or firmware update occurrence, etc.) for each endpoint information handling system 100 and 167 (e.g., retrieved from non-volatile memory 132 or other memory of IT administrative server 130). It will be understood that in one embodiment designated metrics may include the same metrics selected as key metrics for monitoring purposes of block 252, together with additional other metrics, e.g., the key metrics may be a subset of a greater number of designated metrics.

Next, in block 262, each of the designated metrics of endpoint information handling systems 100 and 167 from block 260 may be characterized as a numeric metric (e.g., such as percent utilization of CPU or other resource), a categorical metric (e.g., such as an endpoint system high temperature alert), or a score metric (e.g., such as a percentage health score).

Next, in blocks 264, 266 and 268, each of the designated metrics of endpoint information handling systems 100 and 167 is analyzed either at the individual system level of each endpoint information handling system 100 and 167 of IT environment 101, or is analyzed at a fleetwide system level of all endpoint information handling systems 100 and 167 of IT environment 101. This analysis may include a before to after comparison made for each of the designated metrics by comparing the "after" value of each designated metric measured during the new current time period ($T_C$) or "after segment" of the current iteration of methodology 250 to the "before" value of the same designated additional metric measured during the previous benchmarking time period $T_B$ or "before segment" of the most recent previous iteration of methodology 250. In methodology 250, the characterization of block 262 determines which of blocks 264, 266 or 268 is chosen to analyze a given designated metric.

In numeric data analysis block 264, data of each designated metric that is characterized in block 262 as a numeric metric (e.g., such as % CPU processing utilization) may be analyzed on an individual endpoint information handling system level basis, and its "after" value determined during the new current time period ($T_C$) compared to its "before" value determined during the previous benchmarking time period ($T_B$) to determine a before/after change count for the designated metric on each individual endpoint information handling system. In one embodiment of block 264, numeric metric change counts may be determined based on mean and standard deviation for each designated numeric metric (i.e., where each count is equal to one of an up change count, a down change count or a same (i.e., no change) count determined for a designated numeric metric value on an individual endpoint information handling system). Each of the determined change counts (e.g., up, down and same) may then be summed together for all endpoint information handling systems 100 and 167 of IT environment 101. Significance of these change counts may be determined using statistical testing, e.g., such as chi squared-test of independence and/or paired t-test. In one embodiment, a pre-determined significance level (e.g., 5% or greater) may be applied to the results of the significance testing to determine which of the change counts are significant.

In one embodiment of block 264, a unique identifier (e.g., service tag, serial number, etc.) associated with each given endpoint information handling system 100 and 167 may be used to identify and track metric data associated with that given endpoint information handling system. In one exemplary embodiment, data of a designated numeric metric may be expressed as a utilization variable in the following sequential tasks of the numeric analysis procedure that may be performed in block 264 for each different endpoint information handling system 100 and 167 of IT environment 101 (with each different endpoint information handling system 100 and 167 being assigned, and identified by, a different system service tag or other individual system identifier such as serial number.

In one embodiment of the analysis of block 264, respective test and control samples (or groups) may be "randomly" selected from the endpoint information handling systems 100 and 167 within IT environment 101, and used to compare the effect of (e.g., and determine the significance of) any particular treatment/action (or software update) within. In this regard, a number (e.g., subset) of endpoint information handling systems 100 and 167 within IT environment 101 that experience occurrence of a given action or update context attribute (e.g., such as a software or firmware update occurrence) may be randomly selected as a "test" sample, and a number (e.g., subset) of other endpoint information handling systems 100 and 167 within IT environment 101 that do not experience the occurrence of the same given action or update context attribute (e.g., such as the same software or firmware update occurrence) may be selected as a "control" sample as described in task number four of the following block 264 analysis example:

1. Calculate average and error bar for each variable for before and after segments for each service tag:

diff=variable_after−variable_before error=max(standard_deviation_before, standard_deviation_after)

2. Determine the before to after change (Up, Down, or the Same) for each service tag-feature (i.e., service tag-metric) combination:
   change='Up' if diff>error
   change='Down' if diff<−error
   change='Same' otherwise.

3. Roll up (or sum) each of the up/down/same variable status to get fleet level counts for each variable:
   Up_counts=Up count total across all devices under the fleet
   Down_counts=Down count total
   Same_counts=same count total 4. Significance test: between control sample and test sample:
   test_counts=Up_counts_test, Down_counts_test, Same_counts_test
   control_counts=Up_counts_control, Down_counts_control, Same_counts_control
   Statistical test (such as chi squared-test of independence, etc.) may be used to determine the probability of likelihood of three classes (Up, Down, Same) in control and test group being proportional. Also, paired t-test may be conducted on averages value for each device if the changes are significant on the fleet level.

In categorical data analysis block 266, data of each designated metric that is characterized in block 262 as a categorical metric (e.g., such as high system temperature alert, etc.) may be collected for individual endpoint systems, analyzed and compared on a fleetwide basis (e.g., such as a fleet of information handling systems 100 and 167 of IT environment 101) to determine before/after change counts for the designated categorical metric across all endpoint information handling systems of the fleet. In one embodiment of block 266, before/after change counts may be determined by calculating a before/after change in the total number of alerts generated on each unique endpoint information handling system, or by measuring the number of occurrences of a given mode (or type) of alerts generated on each unique endpoint information handling system. Significance of these change counts may be determined using statistical testing, e.g., such as two-sample proportion z-test, etc.

In one embodiment of block 266, categorical metric before/after change counts may be determined as a difference between an "after" number of endpoint systems (device_counts_after) having alert occurrences determined during the new current time period ($T_C$) and a "before" number of endpoint systems (device_counts_before) having alert occurrences determined during the previous benchmarking time period ($T_B$), e.g., using the following sequential tasks of a categorical analysis procedure that may be performed in block 266 for endpoint information handling systems 100 and 167 of IT environment 101:

1. Calculate system counts (device_count) of the number of endpoint information handling systems experiencing each type of alert message in each before segment and after segment.
   Note: It will be understood that instead of calculating and analyzing system counts (device_count), it is alternately possible that alert counts (alert count) of the total number of alerts that are experienced in each before segment and after segment by the fleet of information handling systems 100 and 176 within IT environment (as a whole) may alternately be calculated and analyzed in a similar manner as described for system counts (device_count) in this example.

2. Retain only those device counts for alert types having a designated minimum set count of alerts in either the before and/or the after segment:
   (minimum_device_count equal to 5 or greater) in either the before and/or the after segment 3. Calculate the difference (diff) in before segment and after segment device counts for each type of alert message and express the differences as a percentage (the difference may be negative (−ve), positive (+ve), or may be zero):

diff_percent_alert=(device_counts_before−device_counts_after)/device_counts_before*100

4. Sort the alert message types according to the calculated percentage differences (i.e., from greatest percentage difference to lowest percentage difference) to determine the most changed (i.e., highest percentage difference) alerts.

5. Perform a significance test (such as two sample proportion z-test, etc.) between before and after segments of test group s1, and between after segment of control group and after segment of test group s2:
   A. Determine the significance between before and after segments of test group, s1:
      device_counts_alert=(device_counts_before, device_counts_after)
      device_counts_total=(device_counts_total_before, device_counts_total_after)
      p1=device_counts_before/device_counts_total_before,
      p2=device_counts_after/device_counts_total_after
      significance_before_after=significance test between p1 and p2.
         Note: For the categorical feature/variable, device_counts_before is the number of devices with the given value (e.g., high temperature alert), and device_counts_total_before is the total number of devices in that test group, s1 (not all the devices will have all the categorical values).
   B. Using a similar methodology as A above, determine the significance between after segments of control group and after segments of test group, s2.
      Note: as used herein, s1 stands for "significance 1" and s2 stands for "significance 2". These are calculated using p1 and p2 in a two sample proportion z-test (or other statistical test), respectively. This is because in this embodiment significance needs the two sets of data to compare (s1 is for the before-after of test group and s2 for the after-after of test/control group). As previously described, "test groups" and "control groups" are randomly chosen sets of endpoint information handling system devices chosen as described above from the fleet of endpoint information handling systems 100 and 167 within IT environment 101.
   C. Both s1 and s2 should be significant to ensure the difference between before and after segments for test group is significant.
      Note: The analyses of this example are performed on the fleetwide level of all endpoint information handling systems 100 and 167 within IT environment 101 since categorical variables have inherent service tag level values, and it is therefore not necessary to process them further to get the service tag-level result (this is in contrast to the numeric analyses example of block 264 where additional processing is performed for the service tag-level result).

In score data analysis block 268, data of each designated metric that is characterized in block 262 as a score metric (e.g., such as user survey scores ranked 1-10, system health scores ranked 1-10, etc.) may be collected for individual endpoint systems, analyzed and compared on a fleetwide basis (e.g., such as a fleet of information handling systems 100 and 167 of IT environment 101) to determine before/after score severity counts for the designated score metric across all endpoint information handling systems of the fleet. Each type of score metric may be characterized as desired for determining severity of each score metric of that type, e.g., score of 8-10 may be characterized as good (or low severity), score of 5-7 may be characterized as acceptable (or medium severity), and score less than 5 may be characterized as bad (or high severity). In one exemplary embodiment, before/after severity counts may be determined by calculating a before/after change in total severity of health score on each unique endpoint information handling system of IT environment 101. Significance of these change counts may be determined using statistical testing, e.g., such as two-sample proportion z-test, etc.

In one exemplary embodiment of block 268, score metric before/after change counts may be determined as a difference between an "after" number of endpoint systems (device_counts_after) having high severity score occurrences determined during the new current time period ($T_C$) and a "before" number of endpoint systems (device_counts_before) having high severity score occurrences determined during the previous benchmarking time period ($T_B$), e.g., by first determining high severity counts and then using categorical analysis-based sequential tasks:

1. Calculate high severity device (system) counts in each before and after segment:
   Categorize (e.g., bucket) the severity (e.g., low, medium, or high) of each before and after score of each endpoint information handling system, and determine device count (i.e., number of endpoint systems) with high severity in the "before" segment and determine the device count with high severity in the "after" segment.

2. Calculate the difference (diff) in before segment and after segment device counts for high severity scores and express the differences as a percentage:

diff_percentage_health_score=(high_severity_counts_before−high_severity_counts_after)/high_severity_counts_before*100

3. Significance test: such as two sample (s1 and s2) proportion z-test between before and after segments of test group s1, and between after segments of control group and test group s2:

A. Determine the significance between before segment and after segment of test group, s1:

device_counts_alert = (device_counts_before, device_counts_after)

device_counts_total =

(device_counts_total_before, device_counts_total_after) · p1 = device_counts_before/device_counts_total_before, p2 = device_counts_after/device_counts_total_after · significance_before _after = significance test between p1 and p2.

B. Using a similar methodology as A above, determine the significance between after segment of control group and after segment of test group, s2.

C. Both s1 and s2 should be significant to ensure the before/after for test group is significant.

Although an exemplary embodiment for implementing score data analysis block 268 using a categorical analysis-based analysis is described above, it will be understood that in an another embodiment, the score data analysis block 268 may be alternatively implemented for score analysis by first determining high severity counts and then using numeric analysis-based sequential tasks similar to that described for block 264 above.

Still referring to FIG. 2B, methodology 250 proceeds next to block 269 where each change or deviation of the designated metrics or features is associated with the corresponding context attributes obtained in block 260 (e.g., current version of BIOS 194, model identifier of information handling system 100 or 167, software or firmware update occurrence such as new application 102 installed by user, automatic update or plug-in added by a self-updating application 102, etc.) to create context attribute-feature combination/s for each given endpoint information handling system 100 or 167. In one embodiment, the measured change between the "Before" metric value and the "After" metric value may be expressed or otherwise characterized as "up" (for an increase in the metric value), "down" (for a decrease in the metric value), and "same" (for no change in the metric value).

Next, in block 270, each given one of the different significant changes from blocks 264, 266 and 268 are rolled up (or summed together) to obtain a total device (i.e., system) count for the given significant change. The total device count for each given one of these different significant changes is then associated with a context attribute-feature combination of block 269 that corresponds to the given different significant change. In one embodiment, each endpoint information handling system 100 and 167 may be mapped to system context attributes such as BIOS version, software update occurrence, endpoint information handling system model etc., and the changes may be rolled up on the information handling system context attribute level (e.g., information handling system model Dell Precision 5550 has average CPU consumption increase in 75% of these systems).

Next, in block 272, the discovery of significant changes from blocks 264, 266 and 268 are ranked or otherwise tabulated on the context attribute-metric (feature) level according to the before versus after "up" percentage difference in the total device (i.e., total endpoint system) count for each given one of these different significant changes (e.g., see Table 1 of Example 1). In this regard, the before/after "up" percentage difference corresponds to a greater "after" utilization, greater "after" number of alerts, or greater severity of "after" health score deterioration.

Next, in block 274, each of the context attributes corresponding to the most percentage difference (e.g., greater than or equal to a predefined reporting threshold of 50%) in the total device count are reported by change discovery logic 133, e.g., to an administrative user of the IT administrative server 130 via UI 131. For example, given an example predefined reporting threshold of 50% for Example 1, the software A-to-software B migration would be so reported since associated features 1, 3, 4 and 5 each correspond to a percentage difference (DIFF_PERCENT) greater than or equal to the reporting threshold of 50%. In one embodiment, each of the features that correspond to a percentage difference (DIFF_PERCENT) greater than or equal to the reporting threshold of 50% may also be so reported together with other information, e.g., such as associated feature (metric), number of systems experiencing the corresponding before/after "up" change, etc. Block 274 then returns to block 252 and the blocks 252 to 274 of methodology 250 iteratively repeat periodically, e.g., on a daily basis, on a weekly basis, every two weeks, etc.

It will understood that the particular combination of blocks of FIGS. 2A and 2B are exemplary only, and that other combinations of additional and/or alternative blocks may be employed that are suitable for automatically discovering intended and/or unintended changes as they occur on endpoint information handling systems in an IT environment 101.

Example 1

The following example illustrates results of a numeric data change analysis according to block 264 of FIG. 2B. The numeric data change analysis of this example is performed upon occurrence of a context attribute in the form of a migration of a first ("Before") endpoint configuration management software (i.e., process) version "A" to a second and different ("After") endpoint configuration management software (i.e., process) version "B" on each of 985 endpoint information handling systems of a common IT environment. In this example, the "Before" software version A has a combined PCT_PROC_TIME that is very low (peak at approximately 1) compared to the "After" software version B (peak at approximately 45), indicating significant increased process usage after the migration from software version A to software version B.

The analysis of Example 1 is performed for five designated utilization metrics (features) that are numbered 1 to 5 in the below Table 1. In Table 1, the column labeled "Up" lists the number of systems for which the given utilization metric increased from Before to After migration, the column labeled "Down" lists the number of systems for which the given utilization metric decreased from Before to After migration, and the column labeled "Same" lists the number of systems for which the given utilization metric did not change from Before to After migration. The column labeled "Difference" lists the difference between the "Up" system counts and the "Down" system counts for the given utilization metric, and the Column labeled "DIFF_PERCENT" is calculated by dividing the Difference value for the given utilization metric by the DEVICE_COUNT_TOTAL (i.e., 985 endpoint systems in Example 1).

TABLE 1

| No. | Feature/Metric | Up | Down | Same | DEVICE_COUNT_TOTAL | Difference. | DIFF_PERCENT |
|---|---|---|---|---|---|---|---|
| 1 | PCT_PROC_TIME_MEAN | 925 | 5 | 55 | 985 | 920 | 93.4 |
| 2 | DATA_BYTES_PER_SEC_MEAN | 322 | 24 | 639 | 985 | 298 | 30.25 |
| 3 | NON_PAGED_BYTES_MEAN | 935 | 3 | 47 | 985 | 932 | 94.62 |
| 4 | PAGED_BYTES_MEAN | 947 | 4 | 34 | 985 | 943 | 95.74 |
| 5 | WORKSET_MEAN | 872 | 7 | 106 | 985 | 865 | 87.82 |

Figure 3:
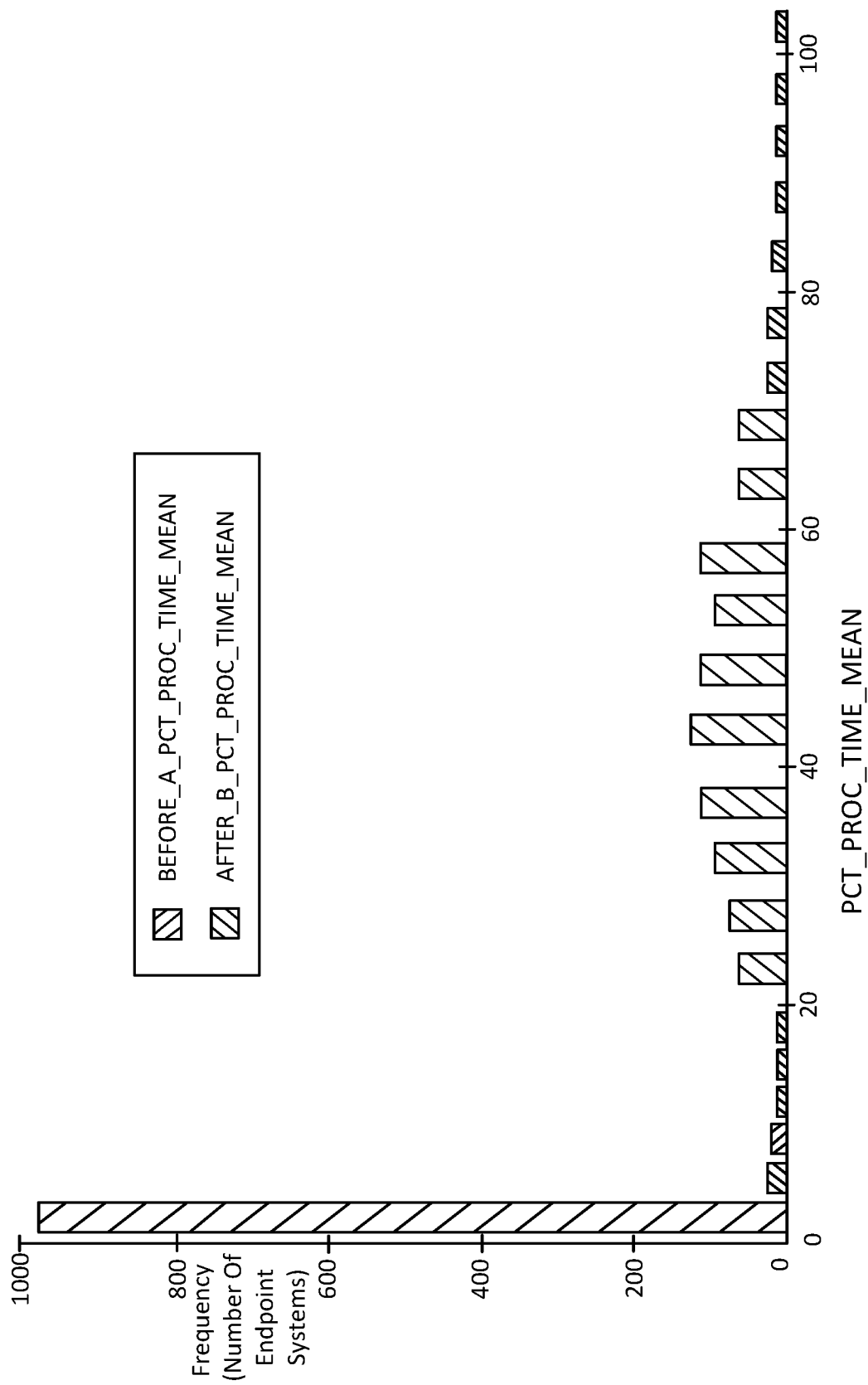
FIG. 3 illustrates a plot of frequency versus mean processing time according to one exemplary embodiment of the disclosed systems and methods.

FIG. 3 is a plot of Frequency (i.e., number of endpoint information handling systems) versus PCT_PROC_TIME_MEAN for "Before" software version A and "After" software version B. FIG. 3 shown that the "After" software version B used significantly more processing time than the "Before" software version A. In one embodiment, the plot of FIG. 3 may be displayed to an IT administrative user by change discovery logic 133 on UI 131 of display device 157.

It will also be understood that one or more of the tasks, functions, or methodologies described herein (e.g., including those described herein for components 102, 103, 105, 107, 110, 133, 143, 150, 154, 155, 165, 167, 171, 175, 180, 194, 197, 199, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
operating multiple separate endpoint information handling systems coupled together by a network within an information technology (IT) environment;
operating one or more hardware components of each given one of the multiple separate endpoint information handling systems while each given one of the multiple separate endpoint information handling systems is coupled together by the network within the information technology (IT) environment, the one or more hardware components of each one of the multiple separate endpoint information handling systems comprising at least a central processing unit (CPU) coupled to system memory and system storage;
changing operation of the one or more hardware components of each given one of the multiple separate endpoint information handling systems to cause each given one of the one or more hardware components to operate under variable operating conditions over time by operating each given one of the one or more hardware components at a first operating condition occurring at a first time and operating each given one of the one or more hardware components at a second operating condition occurring at a second time, the first operating condition being different from the second operating condition and the first time being different than the second time;

monitoring and capturing the variable operating conditions over time for each given one of the multiple separate endpoint information handling systems;

determining a current value of at least one predefined metric and determining a different benchmark value of the at least one predefined metric corresponding to the monitored and captured variable conditions for each given individual one of the multiple separate endpoint information handling systems, the benchmarkvalue of the at least one predefined metric being separately determined for each given individual one of the multiple separate endpoint information handling systems byseparately measuring a monitored value of the at least one predefined metric for given individual one of the multiple separate endpoint information systems during a benchmark time period that is a sliding window time period determined on a rolling basis to be the most recent previous time period for which a previous value of the at least one predefined metric was measured;

determining any change between the current value and the benchmark value of the at least one predefined metric for each given one of the multiple separate endpoint information handling systems;

then associating each determined change between the current value and the benchmark value of the predefined metric for each given one of the multiple separate endpoint information handling systems with at least one common context attribute that is a common process-level event that is associated with each given one of the multiple separate endpoint information handling systems;

then identifying a group of the multiple separate endpoint information handling systems that each has a corresponding determined change between the current value and the benchmark value of the predefined metric that is associated with the at least one common process-level event; and then reporting information regarding the identified group of the multiple separate endpoint information handling systems to a user of a designated information handling system coupled by the network to each of the multiple separate endpoint information handling systems within the IT environment;

where the method further comprises determining whether a number of endpoint information handling systems in the identified group of the multiple separate endpoint information handling systems that have the corresponding determined change represents a deviation that is greater than a predefined threshold value (TH); and then proceeding as follows only if it is determined that the number of endpoint information handling systems in the identified group of the multiple separate endpoint information handling systems that have the corresponding determined change represents a deviation that is greater than the predefined threshold value (TH):

determining any change between a current value and a benchmark value of one or more additional designated metrics for each given one of the multiple separate endpoint information handling systems coupled together by the network within the IT environment, at least one of the additional designated metrics being different than the predefined metric, then associating each determined change between the current value and the benchmark value of each of the additional designated metrics for each given one of the multiple separate endpoint information handling systems with at least one common additional designated context attribute that is associated with the given one of the multiple separate endpoint information handling systems, then identifying a respective group of the multiple separate endpoint information handling systems that each has a corresponding determined change between the current value and the benchmark value of each of the additional designated metrics that is associated with a corresponding respective common additional designated context attribute, then comparing the size of each respective identified group of multiple separate endpoint information handling systems that each has a corresponding determined change to a reporting threshold value, and then only reporting to the user of the designated information handling system the identity of each of the common additional designated context attributes that is associated with a corresponding respective additional designated metric that has a corresponding determined change that is greater than or equal to the reporting threshold value.

2. The method of claim 1, further comprising:

receiving at least one of telemetry variables or metrics related to operation of each of the multiple separate endpoint information handling systems during the sliding window time period;

then using the received telemetry variables or metrics to separately determine the benchmark value of the at least one predefined metric for each individual given one of the multiple separate endpoint information handling systems, where each benchmark value of the predefined metric determined separately for each respective individual given one of the multiple separate endpoint information handling systems corresponds to a state of the predefined metric during the sliding window time period of the respective individual given one of the multiple separate endpoint information handling systems;

then receiving at least one of current telemetry variables or current metrics related to current operation of each of the multiple separate endpoint information handling systems; and then using the received current telemetry variables or current metrics to determine the current value of the predefined metric for each of the multiple separate endpoint information handling systems, where each current value of the predefined metric corresponds to a current state of the predefined metric during the current operation of a respective one of the multiple separate endpoint information handling systems.

3. The method of claim 1, further comprising iteratively repeating the method of claim 1 in an automatic manner to identify the group of the multiple separate endpoint information handling systems corresponding to each current iteration of the method of claim 1; and automatically reporting the information regarding the identified group of the multiple separate endpoint information handling systems corresponding to each current iteration of the method of claim 1 to the user of the designated information handling system during each iteration of the method of claim 1.

4. The method of claim 1, where the at least one common process-level event associated with each given one of the multiple separate endpoint information handling systems comprises a process-levelevent associated with an intended change on the respective individual given endpoint information handling system or a process-level an event associated with an unintended change on the respective individual given endpoint information handling system.

5. The method of claim 4, where the process-levelevent associated with an intended change on the given endpoint information handling system comprises a new software or firmware application installed by an endpoint system user on the given endpoint information handling system; and where the process-levelevent associated with the unintended change on the given endpoint information handling system comprises an automatic software or firmware update or a plug-in that is added on the given endpoint information handling system by a self-updating software or firmware application.

6. The method of claim 1, where the reporting information regarding the identified group of the multiple separate endpoint information handling systems to the user of the designated information handling system comprises reporting to the user of the designated information handling system the identity of the predefined metric and a number of endpoint information handling systems in the identified group of the multiple separate endpoint information handling systems that has a corresponding determined change between the current value and the benchmark value of the predefined metric that is associated with the at least one common process-level event.

7. The method of claim 1, further comprising addressing effects of the corresponding determined change between the current value and the benchmark value of the predefined metric that is associated with the at least one common process-level event by further changing operating conditions of the one or more hardware components of the multiple separate endpoint information handling systems.

8. The method of claim 1, where the changing operation of the one or more hardware components of each given one of the multiple separate endpoint information handling systems comprises operating each given one of the one or more hardware components at the first time to generate a first number of high temperature alerts at the first time, and operating each given one of the one or more hardware components at the second time to generate a second and different number of high temperature alerts at the second time; and
  where the monitoring and capturing the variable operating conditions over time comprises monitoring and capturing the number of high temperature alerts generated over time for each given one of the multiple separate endpoint information handling systems;
  where the determining any change between the current value and the benchmark value of the at least one predefined metric for each given one of the multiple separate endpoint information handling systems comprises determining any change between a current number of high temperature alerts generated for each given one of the multiple separate endpoint information handling systems and a benchmark number of high temperature alerts generated for the corresponding given one of the multiple separate endpoint information handling systems;
  where the then associating each determined change comprises then associating each determined change between the current value and the benchmark value of high temperature alerts for each given one of the multiple separate endpoint information handling systems with at least one common process level event that is associated with each given one of the multiple separate endpoint information handling systems;
  where the then identifying a group of the multiple separate endpoint information handling systems comprises then identifying a group of the multiple separate endpoint information handling systems that each has a corresponding determined change between the current value and the benchmark value of number of high temperature alerts that is associated with at least one common context attribute; and
  where the then reporting information regarding the identified group of the multiple separate endpoint information handling systems then reporting the identity of each of the multiple separate endpoint information handling systems in the identified group of the multiple separate endpoint information handling systems to a user of a designated information handling system coupled by the network to each of the multiple separate endpoint information handling systems within the IT environment.

9. The method of claim 1, where the one or more hardware components of each given one of the multiple separate endpoint information handling systems further comprise a respective given cooling fan; and where the changing operation of the one or more hardware components of each given one of the multiple separate endpoint information handling systems comprises changing operation of each respective given cooling fan to cause the respective given cooling fan to operate under variable operating conditions over time by first operating the respective given cooling fan at a first cooling fan speed operating condition at the first time and then operating the given cooling fan at a second cooling fan speed operating condition at the second time, the first cooling fan speed operating condition being different from the second cooling fan speed operating condition.

10. A method, comprising:
  operating multiple separate endpoint information handling systems coupled together by a network within an information technology (IT) environment;
  operating one or more hardware components of each given one of the multiple separate endpoint information handling systems while each given one of the multiple separate endpoint information handling systems is coupled together by the network within the information technology (IT) environment, the one or more hardware components of each one of the multiple separate endpoint information handling systems comprising at least a central processing unit (CPU) coupled to system memory and system storage;
  changing operation of the one or more hardware components of each given one of the multiple separate endpoint information handling systems to cause each given one of the one or more hardware components to operate under variable operating conditions overtime by operating each given one of the one or more hardware components at a first operating condition occurring at a first time and operating each given one of the one or more hardware components at a second operating condition occurring at a second time, the first operating condition being different from the second operating condition and the first time being different than the second time;
  monitoring and capturing the variable operating conditions over time for each given one of the multiple separate endpoint information handling systems;

determining a current value of at least one predefined metric and determining a different benchmark value of the at least one predefined metric corresponding to the monitored and captured variable conditions for each given individual one of the multiple separate endpoint information handling systems;

determining any change between the current value and the benchmark value of at least one predefined metric for each given one of the multiple separate endpoint information handling systems;

then associating each determined change between the current value and the benchmark value of the predefined metric for each given one of the multiple separate endpoint information handling systems with at least one common context attribute that is associated with each given one of the multiple separate endpoint information handling systems;

then identifying a group of the multiple separate endpoint information handling systems that each has a corresponding determined change between the current value and the benchmark value of the predefined metric that is associated with the at least one common context attribute; and then reporting information regarding the identified group of the multiple separate endpoint information handling systems to a user of a designated information handling system coupled by the network to each of the multiple separate endpoint information handling systems within the IT environment;

where the method further comprises determining whether a number of endpoint information handling systems in the identified group of the multiple separate endpoint information handling systems that have the corresponding determined change represents a deviation that is greater than a predefined threshold value (TH); and then proceeding as follows only if it is determined that the number of endpoint information handling systems in the identified group of the multiple separate endpoint information handling systems that have the corresponding determined change represents a deviation that is greater than the predefined threshold value (TH):

determining any change between a current value and a benchmark value of one or more additional designated metrics for each given one of the multiple separate endpoint information handling systems coupled together by the network within the IT environment, at least one of the additional designated metrics being different than the predefined metric, then associating each determined change between the current value and the benchmark value of each of the additional designated metrics for each given one of the multiple separate endpoint information handling systems with at least one common additional designated context attribute that is associated with the given one of the multiple separate endpoint information handling systems, then identifying a respective group of the multiple separate endpoint information handling systems that each has a corresponding determined change between the current value and the benchmark value of each of the additional designated metrics that is associated with a corresponding respective common additional designated context attribute, then comparing the size of each respective identified group of multiple separate endpoint information handling systems that each has a corresponding determined change to a reporting threshold value, and then only reporting to the user of the designated information handling system the identity of each of the common additional designated context attributes that is associated with a corresponding respective additional designated metric that has a corresponding determined change that is greater than or equal to the reporting threshold value.

11. The method of claim 10, where the at least one additional designated metric comprises at least one of CPU workload, system memory workload, endpoint system alerts, or endpoint system scores for each of the endpoint information handling systems; and where the designated additional context attributes comprise at least one of system basic input/output system (BIOS) version, information handling system model identifier, or software or firmware update occurrence for each of the endpoint information handling systems.

12. The method of claim 10, further comprising:
using statistical analysis to determine the significance of the determined change between the current value and the benchmark value of each of the additional designated metrics for each of the respective identified groups of the multiple separate endpoint information handling systems; and comparing the determined significance of each respective determined change to a predefined significance level to determine the identity of each determined change that has a determined significance greater than or equal to the significance level;

where the comparing the size of each respective identified group of multiple separate endpoint information handling systems that each has a corresponding determined change to the reporting threshold value comprises comparing the reporting threshold value to the size of each respective identified group of multiple separate endpoint information handling systems that corresponds to a determined significant change; and where the then only reporting to the user of the designated information handling system the identity of each of the common additional designated context attributes that is associated with a corresponding respective additional designated metric that has a corresponding determined change that is greater than or equal to the reporting threshold value comprises then only reporting to the user of the designated information handling system the identity of each of the common additional designated context attributes that is associated with a corresponding respective additional designated metric that has a corresponding determined significant change that is greater than or equal to the reporting threshold value.

13. The method of claim 10, where the additional designated metrics comprise at least one of a numeric metric, a categorical metric, or a score metric.

14. A designated information handling system and multiple separate endpoint information handling systems that each comprises at least one programmable integrated circuit, the designated information handling system comprising a programmable integrated circuit coupled by a network to the multiple separate endpoint information handling systems within an information technology (IT) environment, the programmable integrated circuits of the multiple separate endpoint information handling systems being programmed to:

operate the one or more hardware components of each given one of the multiple separate endpoint information handling systems while each given one of the multiple separate endpoint information handling systems is coupled together by the network within the information technology (IT) environment, the one or more hardware components of each one of the multiple separate endpoint information handling systems comprising at least a central processing unit (CPU) coupled to system memory and system storage;

change operation of the one or more hardware components of each given one of the multiple separate endpoint information handling systems to cause each given one of the one or more hardware components to operate under variable operating conditions overtime by operating each given one of the one or more hardware components at a first operating condition occurring at a first time and operating each given one of the one or more hardware components at a second operating condition occurring at a second time, the first operating condition being different from the second operating condition and the first time being different than the second time; and monitoring and capturing the variable operating conditions over time for each given one of the multiple separate endpoint information handling systems;

where the programmable integrated circuit of the designated information handling system is programmed to:

determine a current value of at least one predefined metric and determining a different benchmark value of the at least one predefined metric corresponding to the monitored and captured variable conditions for each given individual one of the multiple separate endpoint information handling systems, the benchmark value of the at least one predefined metric being separately determined for each given individual one of the multiple separate endpoint information handling systems by separately measuring a monitored value of the at least one predefined metric for given individual one of the multiple separate endpoint information systems during a benchmark time period that is a sliding window time period determined on a rolling basis to be the most recent previous time period for which a previous value of the at least one predefined metric was measured, determine any change between a current value and a benchmark value of at least one predefined metric for each given one of the multiple separate endpoint information handling systems within the IT environment, then associate each determined change between the current value and the benchmark value of the predefined metric for each given one of the multiple separate endpoint information handling systems with at least one common context attribute that is a common process-levelevent that is associated with each given one of the multiple separate endpoint information handling systems;

then identify a group of the multiple separate endpoint information handling systems that each has a corresponding determined change between the current value and the benchmark value of the predefined metric that is associated with the at least one common process-levelevent, and then report information regarding the identified group of the multiple separate endpoint information handling systems to a user of the designated information handling system;

where the programmable integrated circuit of the designated information handling system is further programmed to determine whether a number of endpoint information handling systems in the identified group of the multiple separate endpoint information handling systems that have the corresponding determined change represents a deviation that is greater than a predefined threshold value (TH); and then to proceed as follows only if it is determined that the number of endpoint information handling systems in the identified group of the multiple separate endpoint information handling systems that have the corresponding determined change represents a deviation that is greater than the predefined threshold value (TH):

determine any change between a current value and a benchmark value of one or more additional designated metrics for each given one of the multiple separate endpoint information handling systems coupled together by the network within the IT environment, at least one of the additional designated metrics being different than the predefined metric, then associate each determined change between the current value and the benchmark value of each of the additional designated metrics for each given one of the multiple separate endpoint information handling systems with at least one common additional designated context attribute that is associated with the given one of the multiple separate endpoint information handling systems, then identify a respective group of the multiple separate endpoint information handling systems that each has a corresponding determined change between the current value and the benchmark value of each of the additional designated metrics that is associated with a corresponding respective common additional designated context attribute, then compare the size of each respective identified group of multiple separate endpoint information handling systems that each has a corresponding determined change to a reporting threshold value, and then only report to the user of the designated information handling system the identity of each of the common additional designated context attributes that is associated with a corresponding respective additional designated metric that has a corresponding determined change that is greater than or equal to the reporting threshold value.

15. The designated information handling system and multiple separate endpoint information handling systems of claim 14, where the programmable integrated circuit of the designated information handling system is programmed to iteratively perform the following sequence in an automatic manner to identify the group of the multiple separate endpoint information handling systems corresponding to each current iteration:

receive across the network at least one of telemetry variables or metrics related to operation of each of the multiple separate endpoint information handling systems during the sliding window time period;

then use the received telemetry variables or metrics to separately determine the benchmark value of the at least one predefined metric for each individual given one of the multiple separate endpoint information handling systems, where each benchmark value of the predefined metric determined separately for each respective individual given one of the multiple separate endpoint information handling systems corresponds to a state of the predefined metric during the sliding window time period of the respective individual given one of the multiple separate endpoint information handling systems;

then receive at least one of current telemetry variables or current metrics related to current operation of each of the multiple separate endpoint information handling systems;

then use the received current telemetry variables or current metrics to determine the current value of the predefined metric for each of the multiple separate endpoint information handling systems, where each current value of the predefined metric corresponds to a current state of the predefined metric during the current operation of a respective one of the multiple separate endpoint information handling systems; and then automatically report to the user of the designated information handling system the information regarding the identified group of the multiple separate endpoint information handling systems corresponding to each current iteration.

16. The designated information handling system and multiple separate endpoint information handling systems of claim 14, where the at least one process-level event associated with each given one of the multiple separate endpoint information handling systems associated with an intended change on the respective individual given endpoint information handling system or associated with an unintended change on the respective individual given endpoint information handling system.

17. The designated information handling system and multiple separate endpoint information handling systems of claim 16, where the process-levelevent associated with an intended change on the given endpoint information handling system comprises a new software or firmware application installed by an endpoint system user on the given endpoint information handling system; and where the process-levelevent associated with the unintended change on the given endpoint information handling system comprises an automatic software or firmware update or a plug-in that is added on the given endpoint information handling system by a self-updating software or firmware application.

18. The designated information handling system and multiple separate endpoint information handling systems of claim 14, where the programmable integrated circuits of the multiple separate endpoint information handling systems are operable to address effects of the corresponding determined change between the current value and the benchmark value of the predefined metric that is associated with the at least one common process-level event by further changing operating conditions of the one or more hardware components of the multiple separate endpoint information handling systems.

19. The designated information handling system and multiple separate endpoint information handling systems of claim 14, where the programmable integrated circuit of the designated information handling system is programmed to report to the user of the designated information handling system the identity of the predefined metric and a number of endpoint information handling systems in the identified group of the multiple separate endpoint information handling systems that has a corresponding determined change between the current value and the benchmark value of the predefined metric that is associated with the at least one common process-level event.

20. A designated information handling system and multiple separate endpoint information handling systems that each comprises at least one programmable integrated circuit, the designated information handling system comprising a programmable integrated circuit coupled by a network to the multiple separate endpoint information handling systems within an information technology (IT) environment, the programmable integrated circuits of the multiple separate endpoint information handling systems being programmed to:

operate the one or more hardware components of each given one of the multiple separate endpoint information handling systems while each given one of the multiple separate endpoint information handling systems is coupled together by the network within the information technology (IT) environment, the one or more hardware components of each one of the multiple separate endpoint information handling systems comprising at least a central processing unit (CPU) coupled to system memory and system storage;

change operation of the one or more hardware components of each given one of the multiple separate endpoint information handling systems to cause each given one of the one or more hardware components to operate under variable operating conditions overtime by operating each given one of the one or more hardware components at a first operating condition occurring at a first time and operating each given one of the one or more hardware components at a second operating condition occurring at a second time, the first operating condition being different from the second operating condition and the first time being different than the second time; and monitoring and capturing the variable operating conditions over time for each given one of the multiple separate endpoint information handling systems;

where the programmable integrated circuit of the designated information handling system is programmed to:

determine a current value of at least one predefined metric and determining a different benchmark value of the at least one predefined metric corresponding to the monitored and captured variable conditions for each given individual one of the multiple separate endpoint information handling systems, determine any change between the current value and the benchmark value of at least one predefined metric for each given one of the multiple separate endpoint information handling systems within the IT environment, then associate each determined change between the current value and the benchmark value of the predefined metric for each given one of the multiple separate endpoint information handling systems with at least one common context attribute that is associated with each given one of the multiple separate endpoint information handling systems, then identify a group of the multiple separate endpoint information handling systems that each has a corresponding determined change between the current value and the benchmark value of the predefined metric that is associated with the at least one common context attribute, and then report information regarding the identified group of the multiple separate endpoint information handling systems to a user of the designated information handling system;

where the programmable integrated circuit of the designated information handling system is further programmed to determine whether a number of endpoint information handling systems in the identified group of the multiple separate endpoint information handling systems that have the corresponding determined change represents a deviation that is greater than a predefined threshold value (TH); and then to proceed as follows only if it is determined that the number of endpoint information handling systems in the identified group of the multiple separate endpoint information handling systems that have the corresponding determined change represents a deviation that is greater than the predefined threshold value (TH):
- determine any change between a current value and a benchmark value of one or more additional designated metrics for each given one of the multiple separate endpoint information handling systems coupled together by the network within the IT environment, at least one of the additional designated metrics being different than the predefined metric,
- then associate each determined change between the current value and the benchmark value of each of the additional designated metrics for each given one of the multiple separate endpoint information handling systems with at least one common additional designated context attribute that is associated with the given one of the multiple separate endpoint information handling systems,
- then identify a respective group of the multiple separate endpoint information handling systems that each has a corresponding determined change between the current value and the benchmark value of each of the additional designated metrics that is associated with a corresponding respective common additional designated context attribute,
- then compare the size of each respective identified group of multiple separate endpoint information handling systems that each has a corresponding determined change to a reporting threshold value, and
- then only report to the user of the designated information handling system the identity of each of the common additional designated context attributes that is associated with a corresponding respective additional designated metric that has a corresponding determined change that is greater than or equal to the reporting threshold value.

21. The designated information handling system and multiple separate endpoint information handling systems of claim 20, where the at least one predefined metric for each given one of multiple separate endpoint information handling systems comprises system health score, CPU performance, device experience score, application experience score, or battery experience score; and where the at least one additional designated metric comprises at least one of CPU workload, system memory workload, endpoint system alerts, or endpoint system scores for each of the endpoint information handling systems; and where the designated additional context attributes comprise at least one of system basic input/output system (BIOS) version, information handling system model identifier, or software or firmware update occurrence for each of the endpoint information handling systems.

22. The designated information handling system and multiple separate endpoint information handling systems of claim 20, where the programmable integrated circuit is programmed to:
- use statistical analysis to determine the significance of the determined change between the current value and the benchmark value of each of the additional designated metrics for each of the respective identified groups of the multiple separate endpoint information handling systems; and
- compare the determined significance of each respective determined change to a predefined significance level to determine the identity of each determined change that has a determined significance greater than or equal to the significance level;
- where the programmable integrated circuit is programmed to perform the comparison of the size of each respective identified group of multiple separate endpoint information handling systems that each has a corresponding determined change to the reporting threshold value by comparing the reporting threshold value to the size of each respective identified group of multiple separate endpoint information handling systems that corresponds to a determined significant change; and
- where the programmable integrated circuit is programmed to perform the then only reporting the identity of each of the common additional designated context attributes that is associated with a corresponding respective additional designated metric that has a corresponding determined change that is greater than or equal to the reporting threshold value by then only reporting the identity of each of the common additional designated context attributes that is associated with a corresponding respective additional designated metric that has a corresponding determined significant change that is greater than or equal to the reporting threshold value.

23. The designated information handling system and multiple separate endpoint information handling systems of claim 20, where the additional designated metrics comprise at least one of a numeric metric, a categorical metric, or a score metric.

* * * * *